July 17, 1956

R. P. DAVIE, JR 2,755,039

AIRCRAFT WING LEADING EDGE AND SLOT

Filed March 4, 1952

Robert P. Davie, Jr.
INVENTOR.

BY *James N. Clark*

HIS PATENT ATTORNEY.

July 17, 1956     R. P. DAVIE, JR     2,755,039
AIRCRAFT WING LEADING EDGE AND SLOT
Filed March 4, 1952     2 Sheets-Sheet 2
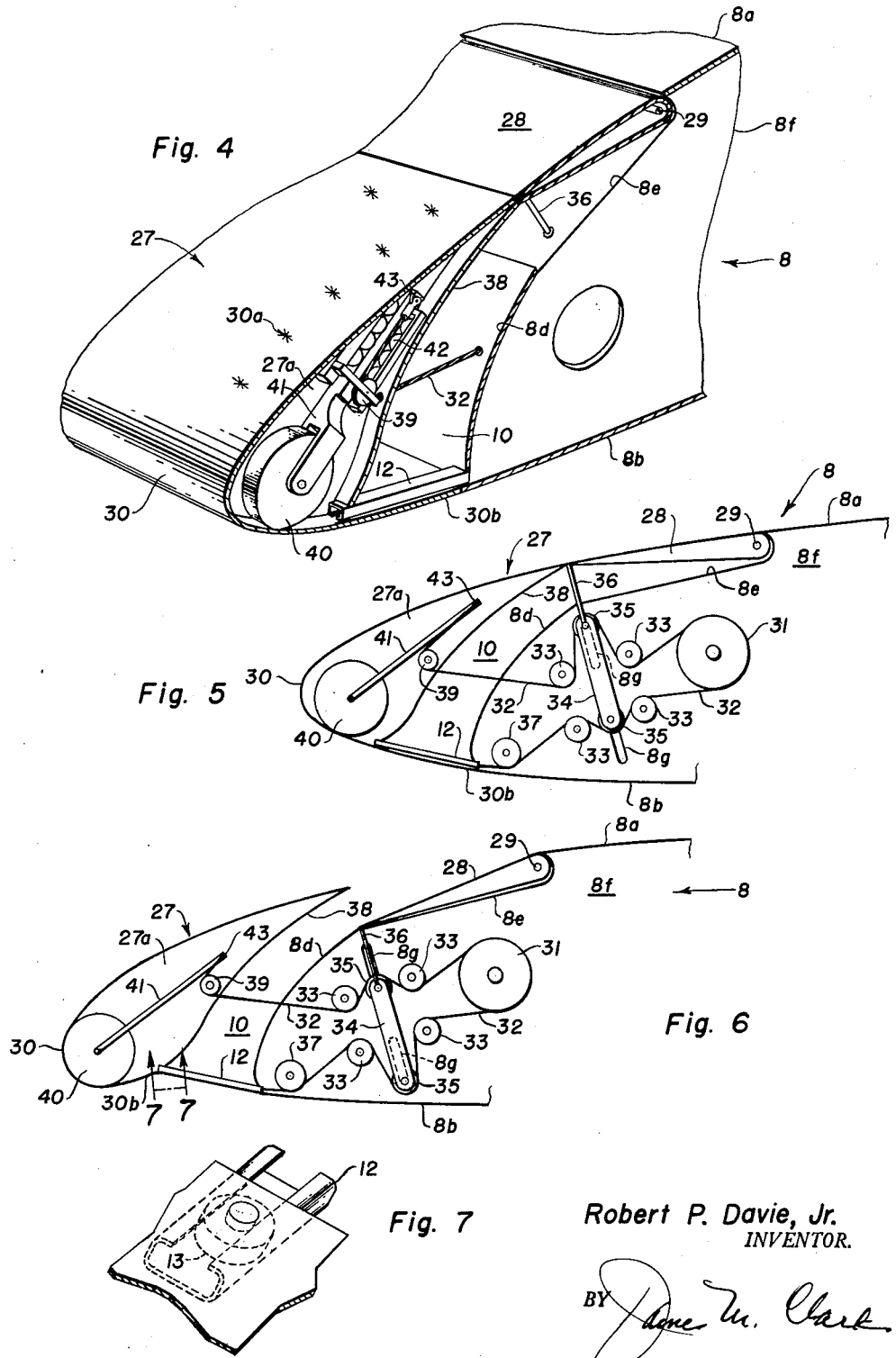
Robert P. Davie, Jr.
INVENTOR.
BY *[signature]*
HIS PATENT ATTORNEY.

ical structure
which may be of a conventional type, supplemented by
a plurality of chordwise bulkheads indicated at $8f$. A
leading edge or nose element 9, having a trailing or heel
portion $9b$, is pivotally mounted for rocking or partial
rotation about the pivot $9a$. The latter is preferably
supported by the chordwise extending fixed bracket member 11 as shown in Fig. 1. With the nose section 9 rotated
about its pivot $9a$ into the full line position shown in
Fig. 2, the undersurface of the nose section 9 and its heel
portion $9b$ form the forward wall of the mouth of the upwardly and rearwardly extending slot 10, which is defined
at its rearward portion by the abovementioned wall $8c$.

United States Patent Office 2,755,039
Patented July 17, 1956

2,755,039

AIRCRAFT WING LEADING EDGE AND SLOT

Robert P. Davie, Jr., Manhattan Beach, Calif., assignor to North American Aviation, Inc.

Application March 4, 1952, Serial No. 274,745

2 Claims. (Cl. 244—42)

The present invention relates to variable camber slotted airfoils and aircraft wings, and more particularly to improved leading edge slot constructions and mechanisms for opening and closing the leading edge slots while simultaneously changing the camber or contour of an aircraft wing.

The present invention is directed to improvements in the construction and mechanism shown in my co-pending application, Serial No. 266,540, filed January 15, 1952, covering Aircraft Wing Leading Edge Construction, differing essentially from the subject matter in that application in respect to the slot-forming features of the present application.

In the design of airfoils, or wings, for aircraft it is frequently desirable to vary the profile or contour of the airfoil as well as to provide a slot for the airflow through the airfoil in order to obtain the most desirable flight characteristics under certain operating conditions. Heretofore numerous arrangements have been proposed for varying the contour or camber of an airfoil, as well as its leading edge portion, and also to provide slots through the airfoil particularly adjacent the leading and trailing edge portions of the airfoil. The present invention relates to improved constructions and mechanisms for accomplishing these results in a more satisfactory manner than has heretofore been obtained by certain of the prior devices.

It is, accordingly, a major objective of the present invention to provide improved variable camber and slot constructions and mechanisms for both varying the contour of the leading edge of an airfoil as well as to regulate the opening and closing of the slots through the airfoil adjacent the leading edge portion. It is a further object to provide such constructions and mechanisms which are simple in operation, as well as positive-acting and foolproof, and which do not impair the structural qualities of the wing. It is also an object to provide an improved joint in an airfoil construction between fixed and sliding portions of the covering skin of the airfoil.

It is a further object of the present invention to provide an improved variable camber leading edge and slot construction in which a pivotally mounted leading edge element is rotatable into a slot opening position in which the nose of the airfoil is simultaneously drooped. It is also an object to provide in such constructions an improved arrangement in which the slot is opened and closed by a flexible wing cover sheet which is rigidly attached to a portion of the airfoil and slidably supported at an opposed portion. It is a still further object to provide an improved variable camber leading edge slot arrangement in which a nose element is pivotally mounted for rotation into a slot-forming drooped attitude in which a slot exit vane is simultaneously opened. A still further object resides in the provision of a contour varying slot-forming mechanism which utilizes a pivotally mounted projectible roller engaging a flexible portion of the wing leading edge for extending the same into projected positions at which predetermined profiles or contours as well as a leading edge slot are obtained, as well as an improved actuating mechanism for accomplishing these results.

Other advantages and objectives of the present invention will occur to those skilled in the art after reading the following description, taken in conjunction with the accompanying drawings, forming a part hereof, in which:

Fig. 4 is a perspective view of a further modification in which the contour of the leading edge is varied by a pivotally mounted projectile roller engaging a flexible portion of the wing leading edge for control of the slot mouth while the slot exit is controlled by a pivotally mounted vane;

Figs. 5 and 6, are diagrammatic showings of the same in the closed and opened positions, respectively; and Fig. 7 is a detail perspective view of the guide roller and track at the slot mouth in the latter modification.

Figure 1:
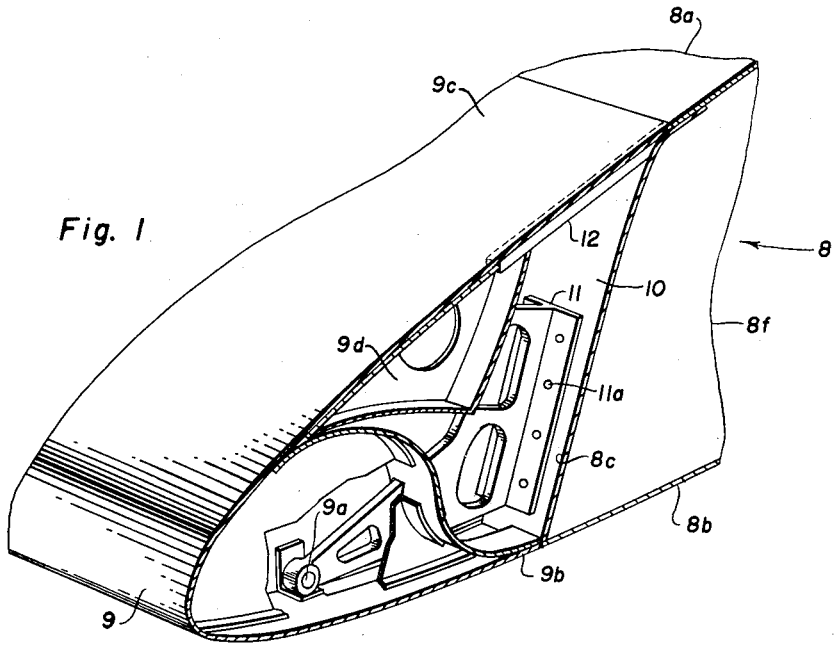
Fig. 1 is a perspective view of a leading edge of an airfoil to which an improved form of the proposed construction and mechanism has been applied.
Figure 2:
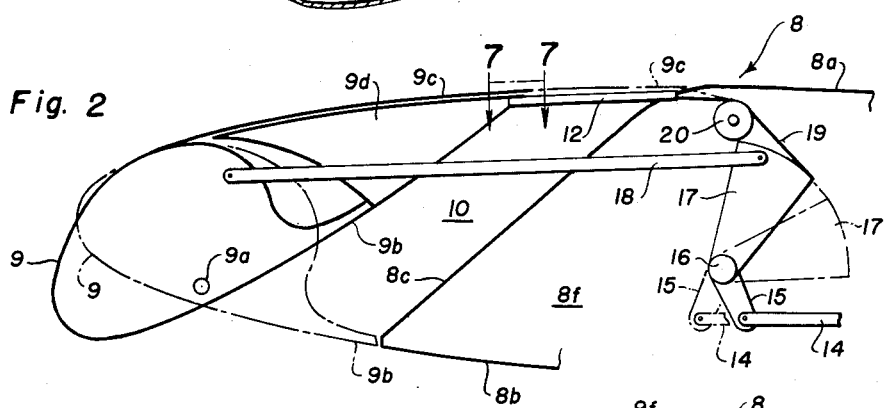
Fig. 2 is a diagrammatic transverse view of the same showing the leading edge element rotated into the drooped slot-forming position.

As shown in Figs. 1 and 2, the numeral 8 represents an airfoil or wing for which only the forward portion is shown. The fixed upper surface or skin covering of the airfoil is indicated at $8a$, the fixed undersurface or lower skin covering at $8b$ and the upwardly and rearwardly sloping aft wall of the slot is indicated at $8c$. The airfoil 8 is preferably provided with suitable internal structure Also as shown in Fig. 1, the supporting brackets 11, of which several will preferably be provided at spaced intervals in the spanwise direction for the support of the pivot $9a$, are secured to the rear wall $8c$ of the slot by means of the fastenings $11a$. The brackets 11 also preferably support a fixed nose section $9d$ disposed upwardly and rearwardly with respect to the rotatable nose section 9 and defining the remainder of the forward wall of the slot 10. The fixed section $9d$ also has an upper surface which forms a streamlined continuation of the main upper surface $8a$ as determined by the profile of the airfoil. The rotatable nose section 9 preferably has fixed to its outer and upper surface a flexible skin sheet $9c$. In the retracted or normal attitude of the nose section 9, as indicated by the construction lines in Fig. 2, in which it closes the slot 10, it is in its extreme clockwise position in which the flexible skin sheet $9c$ is extended rearwardly to a position in which it forms a flush continuation of the upper surface of the skin $8a$ of the main airfoil portion. A plurality of channel-shaped guides or tracks 12 extend across the slot exit adjacent the wing upper surface for engagement by the corresponding pivotally mounted rollers 13 attached to the undersurface of the flexible skin sheet $9c$, as shown in the detail in Fig. 7.

The operating mechanism for rotating the nose section 9 into the slot-opening position is diagrammatically shown in Fig. 2. A push-pull actuating rod 14 extends forwardly within the wing 8 from a suitable operating control from a position within the aircraft at which it may be directly controlled by the pilot, or otherwise motor-controlled, and is pivotally connected to a lever 15 mounted upon the fixed pivot 16. There is also pivotally mounted upon the pivot 16, the pulley segment or lever 17 to which is pivotally connected the aft terminal of a further forwardly extending push-pull rod 18. The forward terminal of the latter is pivotally connected adjacent the upper and aft portion of the nose section 9. The pulley segment 17 is preferably provided with a peripheral groove to the aft portion of which is anchored the cable 19 extending over the idler sheave 20 and connected to the flexible skin portion 9c. It will, accordingly, be obvious that as the actuating rod 14 is translated forwardly, or toward the left in Fig. 2, from the full line position to that indicated in construction lines, it thereby imparts clockwise rotation to the connected elements about the pivot 16. The pulley segment 17 is rotated clockwise, into the construction line position, in which it simultaneously pulls rearwardly on the cable drawing the flexible skin sheet portion 9c across the exit of the slot 10, and the link or rod 18 rocks the nose section 9 about its pivot 9a into the construction line position in which its heel portion 9b closes the mouth of the slot 10. In the open slot full line position of the nose section 9 it droops or extends appreciably below the basic airfoil outline or profile shown in the construction lines.

Figure 3:
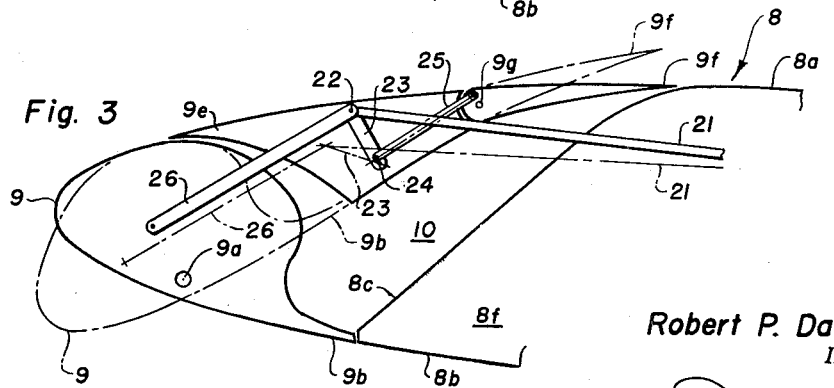
Fig. 3 is a similar diagrammatic transverse view of a modified form of the construction in which the slot exit is controlled by a pivoted vane.

In the modification shown in Fig. 3, the airfoil 8 is provided with upper and lower surfaces 8a and 8b, respectively, as well as a slot-forming wall 8c. This arrangement is similarly provided with a rotatable nose section 9 pivotally mounted upon the pivot 9a and having an undersurface and heel portion 9b. It will be understood that the pivot 9a is supported by similar brackets, as provided in the previous modification, which brackets also support the fixed auxiliary nose section 9e to the upper and aft terminal of which is pivotally mounted the spoiler vane 9f upon the pivot 9g. A similar slot 10 is formed between the rotatable nose section 9 and the fixed nose section 9e on the one hand, and the main airfoil 8 as defined by its slot wall 8c on the other. The undersurface of the spoiler vane 9f is preferably cambered such that in the opened position, indicated in the construction lines, it provides a gradually reducing slot exit.

The actuating mechanism for the arrangement shown in Fig. 3 consists of the pilot-, or motor-actuated push-pull rod 21 pivotally connected at its forward terminal 22 to the links 23 and 26 The forward terminal of the latter is pivotally connected to the rotatable leading edge section 9 and the lower aft terminal of the link 23 is pivotally mounted on the fixed nose section 9e at the pivot 24. At the lower portion of the lever or link 23, adjacent to its pivot 24, it is pivotally connected to the link 25, which in turn is pivotally connected to the spoiler vane 9f adjacent its pivot 9g. Accordingly, it will be noted that as the actuating rod 21 is moved forward from the full line position in Fig. 3 to the position indicated by the construction line the rotatable nose vane 9 is rotated downwardly into its drooped position in which it opens up the mouth of the slot 10. At the same time the link 25, being drawn downwardly and forwardly rotates the spoiler flap 9f into its construction line position in which the exit of the slot 10 is simultaneously opened.

Referring now to Figs. 4, 5 and 6, the airfoil or wing is indicated by the numeral 8, having upper and lower skin surfaces 8a and 8b, respectively, and a slot forming wall 8d merging into an upper straightened wall portion 8e. This modification is provided with a fixed nose section 27 which is fixedly supported from the main airfoil by suitable brackets, which have not been shown in these figures, but which may be similar to those illustrated in Fig. 1. A vane 28 is pivotally mounted upon the pivot 29 adjacent the upper surface 8a of the fixed airfoil, the vane 28 being retractable about the pivot 29 against the wall portion 8b of the airfoil which preferably is provided with chordwise extending bulkheads indicated at 8f. The fixed nose section 27 is preferably provided with a flexible nose skin sheet 30 which is fixedly attached to the upper portion of the fixed section 27 as indicated by the attachments 30a, but its lower surface comprises a flexible unattached portion 30b which may have attached thereto a plurality of rollers 13 for sliding engagement within the channel tracks or guides 12, as shown in detail in Fig. 7.

Referring now more particularly to the diagrammatic showings in Figs. 5 and 6, a drum 31 is preferably mounted upon the bulkhead 8f, or other fixed wing structure, having its grooved periphery engaged by the cable 32. This drum is preferably controllable at will by the pilot, by suitable well known means, and the cable 32 extends forward in engagement with the four idler sheaves 33 disposed on either side of the sheave carrier 34. The latter is provided with idler sheaves 35 at its upper and lower extremities and the pivots for the sheaves 35 preferably are guided for translating movement along the slots 8g within the bulkhead 8f. To the upper terminal of the sheave carrier 35 there is attached an actuator rod 36 connected to the forward tip of the vane 28. The cable 32 extends forwardly through suitable openings in the walls 8d and 38 across the slot 10, the lower strand running beneath the idler sheave 37, across the mouth of the slot to the trailing edge of the flexible skin portion 30b. The upper run of the cable 32 extends across the mid-portion of the slot around in front of the idler sheave 39 which is pivotally mounted upon the fixed nose element 27. The terminal of the cable 32 is attached by the cable connection 43 to the upper aft end of a yoke and stem member 41. The lower forward portion of the latter is bifurcated as shown in Fig. 4 for pivotal engagement by a projectible roller 40 and the upper stem portion is guided for rectilinear movement between the rollers 42.

In Figs. 4 and 5, the drum 31 has been rotated into its extreme counterclockwise position in which the lower strand of the cable 32 has been placed under tension forcing the sheave carrier 34 upwardly along the guide slots 8g and drawing the flexible underskin portion of the nose 30b aft along the guide channels 12 to the position at which the mouth of the slot 10 is closed. As a result of this counterclockwise rotation of the drum 31 the upper run of the cable 32 is in a released or slackened state permitting the upward movement of the sheave carrier 34 to take up substantially all of the play or slack in the upper run of the cable. At the same time, this permits the upward and rearward movement of the roller and yoke assembly 40—41 to its retracted position in which the normal or basic profile of the wing leading edge is provided, as for high speed or cruising flight conditions. Upon clockwise rotation of the drum 31 from the position shown in Fig. 5 to that shown in Fig. 6, the upper run of the cable 32 is placed under tension and is moved rearwardly, forcing the roller and yoke assembly 40—41 forwardly and downwardly. As the tendency to straighten the cable between the upper idler sheaves 33 forces the sheave carrier 34 downwardly within the guide 8g, the movement of the carrier 34 draws down the leading edge of the vane 28 such that it provides a streamlined continuation of the rear exit wall of the slot 10. The clockwise rotation of the drum 31 permits slackening or easing of the lower run of the cable 32 which is taken up by the lowering of the sheave carrier 34 and forward movement of this lower run of the cable 32 permits the downward and forward movements of the roller 40 to deform and draw forwardly the flexible nose sheet 30b to thereby simultaneously open the mouth of the slot 10. The nose portion of the airfoil has now been varied in its camber such that it droops or extends beneath the basic outline of the main airfoil as well as providing an upwardly and rearwardly extending slot 10 of optimum shape to provide the desired characteristics for landing or other low speed flight conditions.

While several preferred forms of the present invention have been shown and described for illustrative purposes, it will be understood that other forms and modifications, which will occur to those skilled in the art after reading the foregoing description, are intended to come within the scope and spirit of this invention as more particularly defined in the appended claims.

I claim:

1. In aircraft wing construction, a fixed main wing portion having a fixed pivot forwardly supported therefrom, a forward surface of said main wing portion defining the rear wall of a slot, a nose portion having a rear surface spacedly disposed forward of said main wing portion forward surface, said nose portion rear surface defining the front wall of said slot, said nose portion including a lower movable nose element pivotally mounted upon said forwardly supported fixed pivot forward of said slot, said nose portion including an upper fixed element spacedly supported forward of said slot, said slot having a mouth at the wing undersurface and an exit at the wing upper surface, the said movable nose element having a flexible skin sheet attached thereto and slidably mounted upon said fixed nose element, guide means extending from said main wing portion to said fixed nose element across said slot exit, said skin sheet normally extending across said slot exit to said fixed main wing portion in sliding engagement with said guide means as a closure for said slot exit, and an actuating mechanism operatively connected to said movable nose element from said main wing portion, said mechanism including lever means pivotally mounted upon said main wing portion, said mechanism including flexible means interconnecting said lever means with said skin sheet, said mechanism including a link pivotally interconnecting said nose element and said lever means arranged such that rotation of said movable nose element about said pivotal mounting causes said nose element to open and close the mouth of said slot at the under-surface of the wing between said movable nose element and said fixed wing portion, said rotation of said movable nose element simultaneously causing said skin sheet in cooperation with said fixed nose element to correspondingly open and close the exit of said slot at said wing upper surface.

2. In aircraft wing construction, a fixed main wing portion having a forwardly facing surface, a nose portion having a rearwardly facing surface spacedly disposed forward of the forwardly facing surface of said fixed main wing portion, a slot formed between the spaced opposedly facing surfaces of said main wing portion and said nose portion, said nose portion including a lower movable element pivotally supported forward from said main wing portion, said lower movable element defining an entrance for said slot, said nose portion including a fixed upper element spacedly supported forward from said main wing portion defining an exit for said slot, guide tracks extending from said fixed main wing portion to said fixed upper element of said nose portion across said slot exit, said movable nose element having an attached flexible skin sheet slidably mounted upon said fixed nose element for movement across said slot exit, said skin sheet having rollers rotatably mounted thereon in engagement with said guide tracks, and actuating mechanism operatively mounted upon said main wing portion and operatively connected to said movable nose element and said attached skin sheet arranged such that rotation of said movable nose element by said mechanism about said pivotal mounting in a first direction opens the entrance of said slot at the undersurface of the wing, the concurrent movement of said skin sheet simultaneously opening the exit of said slot at the upper surface of said wing, and rotation of said movable nose element by said mechanism about said pivotal mounting in the opposite direction closes the entrance of said slot and the concurrent movement of said skin sheet in said opposite direction simultaneously closes the exit of said slot at the upper surface of said wing.

References Cited in the file of this patent

UNITED STATES PATENTS

| | | |
|---|---|---|
| 1,422,615 | Page | July 11, 1922 |
| 1,500,810 | Glansby | July 8, 1924 |
| 1,540,105 | Cook | June 2, 1925 |
| 1,631,259 | Gilmore | June 7, 1927 |
| 1,766,107 | Cook, Jr. | June 24, 1930 |
| 1,817,281 | Williams | Aug. 4, 1931 |
| 1,848,368 | McMaster | Mar. 8, 1932 |
| 2,229,020 | Griswold | Jan. 14, 1941 |
| 2,258,490 | Gutridge | Oct. 7, 1941 |
| 2,306,759 | Sears | Dec. 29, 1942 |
| 2,365,382 | Bolkow | Dec. 19, 1944 |
| 2,378,528 | Arsandaux | June 19, 1945 |
| 2,381,681 | Maxwell | Aug. 7, 1945 |
| 2,384,933 | Lee | Sept. 18, 1945 |

FOREIGN PATENTS

| | | |
|---|---|---|
| 330,003 | Germany | Dec. 6, 1920 |
| 856,553 | France | Mar. 23, 1940 |